(12) United States Patent
Takemori et al.

(10) Patent No.: US 7,099,058 B2
(45) Date of Patent: Aug. 29, 2006

(54) HOLOGRAM PREPARING METHOD

(75) Inventors: Tamiki Takemori, Hamamatsu (JP); Kenji Kon, Mutsu (JP)

(73) Assignees: Hamamatsu Photonics K.K., Shizuoka (JP); Artnow Ltd., Aomori (JP)

( * ) Notice: Subject to any disclaimer, the term of this patent is extended or adjusted under 35 U.S.C. 154(b) by 127 days.

(21) Appl. No.: 10/497,087

(22) PCT Filed: Nov. 29, 2002

(86) PCT No.: PCT/JP02/12543

§ 371 (c)(1),
(2), (4) Date: May 28, 2004

(87) PCT Pub. No.: WO03/046668

PCT Pub. Date: Jun. 5, 2003

(65) Prior Publication Data

US 2005/0030603 A1 Feb. 10, 2005

(30) Foreign Application Priority Data

Nov. 30, 2001 (JP) .............................. 2001-367378

(51) Int. Cl.
*G03H 1/02* (2006.01)
(52) U.S. Cl. .............................. 359/28; 359/22; 359/30
(58) Field of Classification Search .................. 359/28, 359/22, 30, 31, 23
See application file for complete search history.

(56) References Cited

U.S. PATENT DOCUMENTS

| | | | |
|---|---|---|---|
| 6,185,018 B1 | 2/2001 | Kihara | 359/23 |
| 2003/0142379 A1 | 7/2003 | Takemori et al. | 359/35 |
| 2005/0270609 A1* | 12/2005 | Chuang et al. | 359/22 |

FOREIGN PATENT DOCUMENTS

| | | |
|---|---|---|
| JP | 03-249686 | 11/1991 |
| JP | 06-266274 | 9/1994 |
| JP | 10-026924 | 1/1998 |
| JP | 10-143056 | 5/1998 |
| JP | 11-258971 | 9/1999 |
| JP | 2001-183962 | 7/2001 |
| JP | 2002-049293 | 2/2002 |

* cited by examiner

*Primary Examiner*—Fayez G. Assaf
(74) *Attorney, Agent, or Firm*—Drinker Biddle & Reath LLP (57) ABSTRACT

In the method for producing holograms, a plurality of images displayed on a spatial optical modulating element 6 is used as the object light. Through a lens array 7 composed of a plurality of lenses disposed corresponding to each of the images, which are included in the object light, and a reducing optical system 9 and 10 for reducing the object light emitted from the lens array 7, the object light is made to irradiate a recording surface 11 along with a reference light; thereby interference light between the object light and the reference light is recorded on the recording surface 11. Between the spatial optical modulating element 6 and the lens array 7, partitions 15 for separating the respective images are provided; thereby noise is reduced.

6 Claims, 6 Drawing Sheets

HOLOGRAM PREPARING METHOD

TECHNICAL FIELD

The present invention relates to a method for producing a hologram.

BACKGROUND ART

Japanese Laid-Open Patent Publication No. 3-249686 discloses an example of producing one-step Lippman type hologram which has vertical and horizontal parallax.

Figure 6:
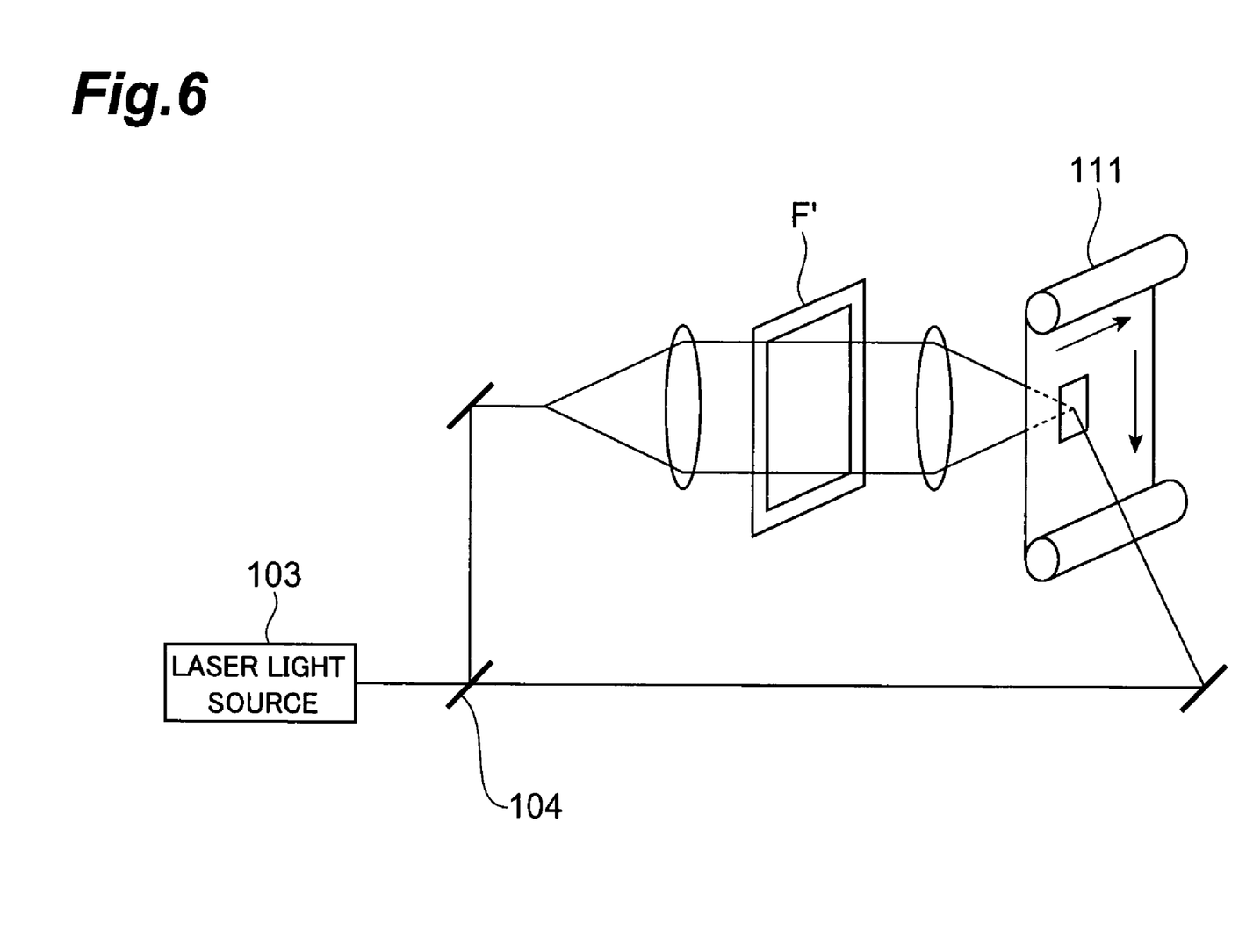
FIG. 6 is a drawing for showing the constitution of a conventional apparatus for producing two-dimensional holograms.

FIG. 6 is a drawing showing the configuration of an apparatus for producing two-dimensional hologram disclosed in the above Publication. In this apparatus for producing the hologram, the laser light, which is output from a laser light source 103, is branched into two beams by a beam splitter 104. One of the branched laser light is expanded in diameter of luminous flux, and enters a spatial optical modulating element F' such as transmissive liquid crystal display device and so forth. After being subjected to an amplitude modulation at each pixel of the spatial optical modulating element F', which displays images viewed from each observing point created by a computer, the beam interferes with a reference light, which enters a photosensitive material 111 from the backside thereof by means of a lens, so that the element hologram is formed on the photosensitive material 111.

Thus, dot-like element holograms are arranged in a matrix-like configuration at 0.3–0.5 mm intervals on the photosensitive material 111, and thus, the Lippman type holograms are made out. And, when reproducing the image, by irradiating the holograms with a parallel pencil having a large luminous flux diameter from the same direction as the incident direction of the above reference light, reproduced waves are generated from each element hologram on the holograms 111; thus an object image is reproduced.

However, since the number of the element holograms, which are recorded by one recording, is limited to one, there is such problem that it takes an extremely long recording time for recording all element holograms. Conventional examples for solving the problem are described below.

(Conventional example 1) Japanese Laid-Open Patent Publication No. 2001-183962 discloses a method for producing hologram, in which a plurality of element holograms are recorded at one time while eliminating reducing optical system. In the method for producing hologram set forth in the above Publication, 3×4 images having different observing point are displayed on a liquid crystal panel, and the laser light, which have passed through the liquid crystal panel, is subjected to a modulation. The laser light, which contains image information of the liquid crystal panel, passes through a lens array composed of 3×4 convex lenses. By disposing a mask, which determines the size of the element holograms, and a photosensitive material in a rear-side focal plane of the convex lens array, twelve element holograms having the same intervals as that of the display images and the size same as the opening of the mask can be recorded at one time. In this method, in order to record the element holograms on the entire surface of the photosensitive material, the exposure is carried out while shifting the photosensitive material by a distance equivalent to the size of the mask opening.

(Conventional example 2) "M. Yamaguchi, H. Endoh, T. Koyama, N. Ohyama, "High-speed recording of full-parallax holographic stereograms by a parallel exposure system" (Opt. Eng. 35(6) 1556–1559 (June 1996))" discloses a method for producing holograms in which twelve element holograms are recorded at one time. According to this document, 3×4 images with a different observing point respectively are displayed on the liquid crystal panel, and the laser light, which has passed through the liquid crystal panel, is subjected to modulation. The laser light, which contains image information of the liquid crystal panel, passes trough a lens array, which is constituted of 3×4 concave lenses. The light, which has passed through the respective concave lenses, are reduced by an a focal reducing optical system, which is composed of a combination of two convex lenses, and projected onto a photosensitive material. Here, the front-side focal position of the concave lens and the surface of the photosensitive material constitute an image forming relationship in the reducing optical system. According to this method for producing holograms, in order to record the images on the entire surface of the photosensitive material, the exposure is carried out while shifting the photosensitive material by a distance equivalent to three or four times of the element holograms.

DISCLOSURE OF THE INVENTION

The stereograms, in which minute element holograms are recorded along the vertical and horizontal directions, has vertical parallax and horizontal parallax; and has excellent characteristics such that, even when the distance between the hologram and the observing point is altered, the vertical magnification and the horizontal magnification agree with each other, and no distortion is generated on the reproduced images. However, since the number of the recorded element holograms is extremely large, there is such problem that an extremely long time is required to make the holograms.

As the conceivable means for reducing the recording time, it is effective to record a plurality of element holograms simultaneously. As the achieving means thereof, the following methods are available: (a) a method, in which a plurality of light sources, which are no-interference with each other, and a plurality of spatial optical modulating elements corresponding thereto are disposed in parallel, and a plurality of element holograms are recorded simultaneously; (b) a method, in which a single light source and a single spatial optical modulating element are provided, a plurality of images are displayed on the spatial optical modulating element, a plurality of condensing points are generated using a plurality of condensers with respect to each of the images, and at these condensing points, element holograms are recorded; (c) a method, in which a plane of the condensing points according to the above method (b) is further reduced, and a plurality of element holograms are disposed at a high density; and (d) a method, in which a plurality of the above methods (b) and (c) are used simultaneously.

The conventional example 1 is of the above-mentioned method (b). Since a singe laser light is expanded and used as the object light and the reference light, in order to make the light for radiating each of the images and the light intensity of a plurality of reference light for recording the element holograms be uniform, anti-Gaussian filter, which causes the transmittance to rise from the center toward the periphery, is used. Also, in order to make the incident angle of the reference light for recording each of the element holograms be exactly uniform, an optical system for adjusting the angle is required. Accordingly, there is such problem that the method becomes complicated and is resulted in a high cost.

The conventional example 2 is of the method (c) Observing the photographs disclosed in a document 1, it is failed in obtaining clear reproduced images. As a reason of this, mainly a cause of accuracy in experiment is described. That is, (1) accuracy in arrangement of the lens array is poor; (2) a large aberration due to inclination of each lens in the lens array; and (3) it is failed in obtaining desired angle of the reproduced light and divergent angle due to the aberration of the reducing optical system, and so on. However, there are principle problems in this example.

First, what are recorded on the element holograms are folding integrated images of reduced images of a light source, which is located at the front-side focus of a concave lens, and the spectrum of the images. Compared to the gap between the element holograms, the size of the integrated images is extremely smaller. Accordingly, when a proper exposure is made while taking into-consideration the dynamic range of the photosensitive material, there are gaps, which cause the quality of the reproduced images to be degraded.

Japanese Laid-Open Patent Publication No. 6-266274 discloses a technique, in which, in order to prevent these gaps, a phase plate for putting the phase of each pixel foreword or behind is interposed. Each of the phase alternation elements is disposed at random. To distribute the light to the entire element holograms, a light distribution, which has no gap at the input plane of the reducing optical system, has to be formed before hand.

However, in the above technique, in which the phase equivalent to approximately four bits is modulated on each pixel, assuming that the pixel pitch is P; the focal distance of the concave lens is f3; and the wavelength is λ, the magnitude of the light distribution at the condensing point D is obtained by the following expression 1.

$$D = \lambda \times f3 / P \quad \text{(Expression 1)}$$

When the above expression is applied to the example of the document 1, it is resulted in that D=0.6328 (μm)×0.3 (m)/93.75 (μm)=2.0 mm. The value is smaller than the required image plane size (6 mm). Besides, the size of the element holograms formed by the reducing optical system is 0.1 (mm). Accordingly, gaps are inevitably generated between the pixels causing the quality of the reproduced images to be degraded.

Second, the position of the displayed images on the liquid crystal panel, which are reproduced by the respective element holograms is close to the element holograms. Accordingly, the expansion of the reproducing light beam becomes too large resulting in a degradation of the reproduced images. When the focal distance of the rear-side lens L1, which constitutes the reducing optical system, is represented with f1; the position of the output image is represented with b1; the focal distance of the front-side lens L2, which constitutes the reducing optical system, is represented with f2; and the position of the input image is represented with a2, the position of the displayed images on the liquid crystal panel reproduced by the respective element holograms is expressed by the following expression 2.

$$b1 = f1 \times \left(1 + \frac{f1}{f2 - b2}\right) = f1 + \left(\frac{f1}{f2}\right)^2 \times (f2 - a2) \quad \text{(Expression 2)}$$

Here, a2 indicates a distance from the lens L2 to the image formation position on the liquid crystal panel from which high-order diffracted images are removed. In the document 1, since the respective values are not indicated, it can not be clearly determined, but, since f1/f2=1/20, and if a2=0, since b1<=f1+f2/400, the images on the liquid crystal panel are formed at the position where is f2/400 away from the rear-side focus of the lens L1.

For example, assuming that f2=500 (mm) and f1=25 (mm), the liquid crystal panel of a size of 1/20 is reproduced at the position several mm away from the element holograms.

Taking the light beam, which is generated from the element holograms, to consideration, assuming that the size of the element holograms is 0, the size of the pixel on the liquid crystal panel is: 93.75 (μm)/20=4.69 (μm), and the distance between the element holograms and the reproduced pixels is 1.25 (mm), the gap angle from the element holograms to the neighboring light beams of the reproduced pixels is resulted in 0.21°.

However, assuming that the size of the element holograms is 0.1 (mm), divergent angle passing through one reproduced pixel from an element hologram is 4.58°. Accordingly, in this case, the followings are resulted in. That is, the observing angle of a stereoscopic image, which should be observed from a various angles, is reduced. And, since a plurality of light beams, which has passed through the pixels, enters the observing point being overlapped with each other, light beams of the stereoscopic image, which should be observed from various angles, are observed simultaneously resulting in an indistinct reproduced image.

The present invention has been achieved in view of the above-described problems. An object of the present invention is to provide a method for producing holograms capable of reducing noises observed in reproduced images.

According to the method for producing holograms of the present invention, wherein a plurality of images displayed on a spatial optical modulating element or diffusion screen are used as object light, through a lens array composed of a plurality of lenses disposed corresponding to the respective images included in the object light and a reducing optical system for reducing the object light output from the lens array, the object light are projected onto the recording surface along with a reference light; thereby interference light between the object light and the reference light is recorded on the recording surface, is characterized in that partitions to separate the respective images are provided at least between the spatial optical modulating element and the lens array.

Also, the method for producing holograms of the present invention is characterized in that the distance between a display surface of the plurality of images and the lens array composed of a plurality of lenses and the distance between the lens array and the reducing optical system are arranged so that the position of real image or virtual image formed by the lens array and the reducing optical system on the display surface of the plurality of images coincides with the observing position of the holograms, or is away from the holograms.

According to this method for producing holograms, the object light, which have passed through the spatial optical modulating element, are the diffused illumination light, which have been modulated. Accordingly, the size of the respective condensed light images on the lens array is larger than that of the respective plurality of images, which are displayed on the spatial optical modulating element, and the illuminance thereof is substantially uniform with each other. Owing to this, it is prevent gap from being generated between the element holograms. Also, to prevent the condensed light images of the lens array from overlapping with each other, the partitions are provided. Thereby, the light for recording element holograms in the neighboring region where particular element holograms are recorded is prevented from being mixed with the light. Accordingly, element holograms with an appropriate size can be recorded in order without gaps.

Owing to that the size of the element holograms can be arranged, it is possible to prevent the thickness of the luminous flux, which reproduces the pixels of the spatial optical modulating element from the element holograms, from becoming undesirably thick. Accordingly, it is possible to increase the spatial resolution of the observed reproduced three-dimensional images.

Further, by arranging the distance between the lens array and the spatial optical modulating element, and the distance between the lens array and the reducing optical system, it is possible to determine the size and the position of the reproduced spatial optical modulating element as well as to arrange the thickness of the luminous flux which reproduces the pixels of the spatial optical modulating element from the element holograms. Accordingly, the spatial resolution of the observed reproduced three-dimensional images can be increased. Furthermore, with respect to the position of the reproduced spatial optical modulating element, it is possible to arrange so that the neighboring luminous fluxes enter the pupils at the observing point and do not overlap with each other; i.e., it is possible to arrange so that the distance between the holograms and the observing point is equal to or shorter than the distance from the holograms to the reproduced images of the spatial optical modulating element. Accordingly, the quality of the observed reproduced three-dimensional images can be increased. Simultaneously, unexpected scattered light, which is generated from the surface of the spatial optical modulating element, is focused on the observing point or the backside of the observing point, and observed at least on the reproduced three-dimensional images or at the backside thereof. Accordingly, the quality of the reproduced images is prevented from being degraded.

BEST MODE FOR CARRYING OUT THE INVENTION

Hereinafter, methods for producing holograms according to embodiments will be described. The same elements will be given with the same reference numerals and the descriptions thereof will be omitted.

FIRST EMBODIMENT

Figure 1:
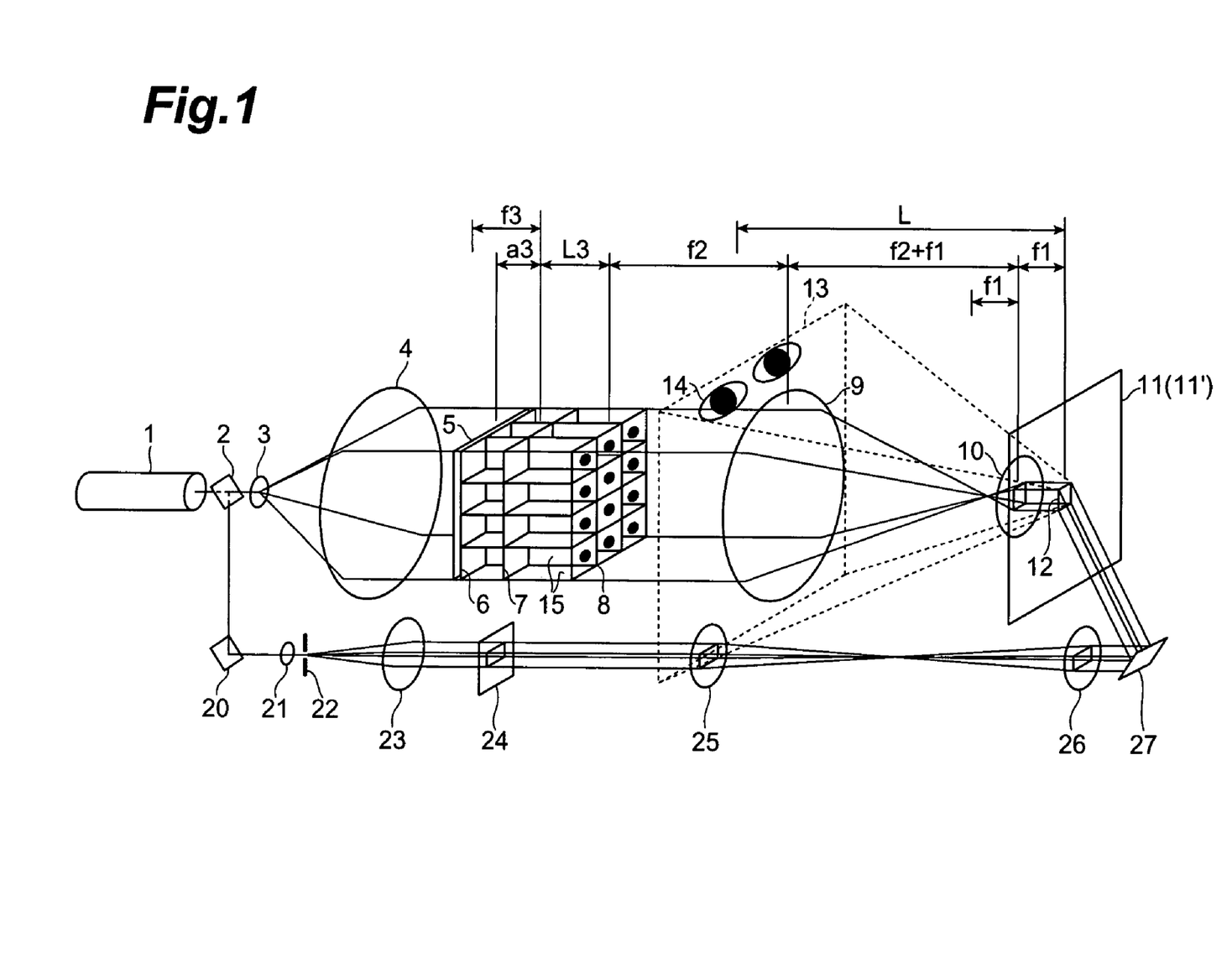
FIG. 1 is a drawing for illustrating an apparatus for producing holograms according to a first embodiment.

FIG. 1 is a drawing for illustrating an apparatus for producing holograms. In this apparatus, a plurality of images are displayed in a matrix-like configuration on a spatial optical modulating element 6; after each of the images is condensed by a lens array, which comprises a plurality of lenses corresponding to the respective images, each image is reduced and focused by an aforcal optical system; and projected onto a photosensitive material 11 and recorded thereon. An image on the spatial optical modulating element 6 is formed as a virtual image, and the observing point is located at the position of the virtual image, or in a range from the position of the virtual image to the photosensitive material.

This apparatus is provided with a laser light source 1 that emits laser light of a single wavelength and a half mirror 2 that branches the laser light output from the laser light source 1. The laser light, which has been branched by the half mirror 2, go through (i) an object light irradiation optical system and (ii) a reference light irradiation optical system, respectively; and are made to irradiate the surface (referred to as front surface) and the rear surface of the photosensitive material 11; thus, holograms are formed by the interference light thereof. The formed holograms are reproduced by (iii) a hologram reproducing optical system. Hereinafter, a detailed description will be given.

(i) Object Light Irradiation Optical System

The object light irradiation optical system is provided with a beam expander, which is constituted of lenses 3 and 4 disposed so that the beam, which has passed through the half mirror 2, is incident thereon as the chief ray, a diffusing plate 5 which is illuminated with plane wave, of which diameter of light beam has been expanded by these beam expanders 3 and 4, the spatial optical modulating element 6 disposed immediately behind the diffusing plate 5, a condenser array 7 on which the light passed through the spatial optical modulating element 6 (images from the spatial optical modulating element) is incident, and a light shielding plates (partitions) 15 disposed for preventing a plurality of images, which constitute the images from the spatial optical modulating element, from interfering with each other. The partitions 15 are provided so that the at lest condensed light images do not overlap with each other between the condensed light images, which are formed by the spatial optical modulating element 6 and the lens array 7.

The object light (a plurality of images), which is output from the condenser array 7, is diffused at a substantially uniform light intensity at a front-side focal plane 8 of a reducing optical system, which is composed of lenses 9 and 10. After being reduced by the reducing optical system, the object light enters the front surface of the photosensitive material 11.

The reducing optical system is an aforcal optical system that reduces input images on the front-side focal plane 8 of the lens 9, and forms the images on the rear-side focal plane of the lens 10. In FIG. 1, in order to facilitate the understanding, the drawing, in which peripheral partitions are removed, is shown.

The spatial optical modulating element 6 is an electrical address type spatial light modulator, and is constituted of a liquid crystal display or the like. The spatial optical modulating element 6 modulates the light intensity (amplitude) of the incident plane waves based on each pixel and transmits the same. The display image of the spatial optical modulating element 6, i.e., light images, which are output from the spatial optical modulating element 6 can be changed by changing the transmittance of each pixel. The liquid crystal, which is used in this example, has 1024×768 pixels; and on the entire display area, 12 images of 256×256 pixels (horizontal 3 rows×vertical 4 columns) can be displayed.

In order to facilitate the understanding, now it is assumed that twelve points where the optical axis of each lens of the lens array 7 crosses with the front-side focal plane 8 of the lens 9 are the twelve images. Almost all luminous flux passes the exposing range 13 through the reducing optical system (lenses 9 and 10) constituted of afocal lens optical system to form 12 reduced images on the photosensitive material 11; thus 12 element holograms are made.

(ii) Reference Light Irradiation Optical System

The reference light irradiation optical system is provided with a set of plane reflecting mirrors 20 and 27 that further reflect the light, which has reflected by the above-described half mirror 2, to lead the light to the rear surface side of the photosensitive material 11. The rear surface of the photosensitive material 11 is tilted with respect to the incident direction of the reference light. The reference light, which has been output from the laser light source 1, is, same as the object light, expanded in the diameter of the beam into a parallel light beam by a set of beam expanders (afocal lens optical system) 21 and 23. At a position of aperture between the beam expanders 21 and 23, a space filter 22, which serves as the aperture, is disposed; thereby the wave front is reformed.

After the beam diameter is expanded, the reference light passes through a mask 24, which has a rectangular opening, passes through an afocal lens optical system 25 and 26, and is projected onto the photosensitive material 11 to form images thereon. The area of the opening of the mask 24 is arranged so that the reference light, which has the same area as that of the object light, is projected onto the photosensitive material 11.

The front surface of the photosensitive material 11 is perpendicular to the optical axis of the lens 10, which constitutes the reducing optical system, and the chief ray (object light) of the incident light, which enters the lens 10, enters the photosensitive material 11 perpendicular thereto. From the front surface side of the photosensitive material 11, the object light enters a region of the photosensitive material 11 perpendicular thereto; and from the rear surface side thereof, the reference light enters the same region thereof having an angle with respect thereto. Owing to the incidence of these object light and reference light, a minute region 12 on the photosensitive material 11 is exposed with a plurality of, so-called, Lippman type element holograms. Within the minute region 12, twelve element holograms are included.

The photosensitive material 11 is composed of a transparent glass plate applied with silver salt emulsion. As the emulsion, in addition to the above, a photosensitive material such as gelatin dichromate may be used. Also, a high molecular material such as photopolymer may be used.

According to this embodiment, while displaying the respective images observed from a plurality of observing points simultaneously on the spatial optical modulating element 6, the above-described plurality of element holograms as the interference light is recorded (exposed) within the minute region 12 corresponding to the respective positions of observing points on the photosensitive material 11. Here, it is assumed that two axes defining the plane perpendicular to the optical axis of the lens 10 of the reducing optical system are x-axis and y-axis. When an exposure is completed, the photosensitive material 11 is shifted along the x-axis or y-axis, the next exposure of the element holograms is carried out. The amount of shift of the element holograms is equivalent to an amount of the display area of the spatial optical modulating element 6 multiplied by the magnification of the rducing optical system. Owing to this, the plurality of element holograms, each of which includes a plurality of parallax images, is disposed in a matrix-like configuration on the photosensitive material 11.

When the photosensitive material 11 is subjected to a developing processing, the following holograms (given with reference numeral 11') are produced in a plurality of regions. That is, a plurality of Lippman type element holograms, of which transmittance and/or phase changes corresponding to the intensity of the interference fringes projected in the plurality of minute regions 12, are formed.

On the hologram 11', actual objects, which are actually photographed, or virtual objects, which are generated by computer graphics or the like, can be recorded.

Two methods for displaying actual objects will be described. First, a method for displaying a reproduced object at the back of the holograms 11', in which the holograms 11' are observed from the observing point, is as described below. That is, an image of an object photographed with an imaging lens of which center is located at the position of the element holograms, is expanded or reduced and displayed simultaneously on the spatial optical modulating element 6 while taking into consideration the size of the actual object and the reproduced object, and the operation of recording on the photosensitive material 11' is repeated. Secondly, the method for displaying in a manner such that the reproduced object crosses in front of the holograms 11', or the holograms 11' cross the reproduced object is as described below. That is, a plurality of images of the photographed image, which is newly created by rearranging the pixels of the plurality of photographed images, is displayed in parallel simultaneously on the spatial optical modulating element 6 and recorded on the photosensitive material 11'.

The method for displaying a virtual object is as described below. That is, assuming that the element holograms as the observing point; and an real image or a virtual image on the spatial optical modulating element as the image on the screen display, after arbitrary disposing the virtual object, a perspective conversion with respect to the element holograms as the observing point is carried out. The images are subjected to a hidden surface removal processing on the overlapped objects so that the object closer to the actual observing point is left, and then, displayed in parallel simultaneously on the spatial optical modulating element 6, and the recording operation on the photosensitive material 11' is repeated. These various methods for producing images to be displayed are conventionally known, and disclosed, for example, in the Japanese Laid-Open Patent Publication No. 7-36357 and the Japanese Patent Publication No. 3155263.

(iii) Hologram Reproducing Optical System

Using a conjugation reference light, which enters in the direction opposite to that of the reference light, as a reproducing beam of the holograms 11', when conjugation light reproduction is carried out, the reproducing beam, which illuminates the holograms 11', has a component of 0-th diffraction light, which transmits through the holograms 11' as it is in the proceeding direction of the light, and a component of primary diffraction light, which is reflected so as to have the same wave front as that of the object light.

Here, the case where the spatial optical modulating element 6 is disposed closer to the lens array 7 than the front-side focal plane of the lens array 7 will be considered. That is, assuming that the front-side and rear-side focal distance of the lens array 7 is f3 respectively; and the distance between the spatial optical modulating element 6 and the lens array 7 is a3, it is the case of a3<f3.

In this case, when producing the holograms 11', the object light (images on the spatial optical modulating element), which is made to irradiate from the spatial optical modulating element 6, is equivalent to the divergent light from the images on the spatial optical modulating element (referred to as virtual images) 13, which is virtually placed at a position closer to the light source than the above-mentioned front-side focal plane (this position is referred as position of virtual image, and is indicated by distance L from holograms 11' (photosensitive material 11)). Since a plurality of images are displayed on the spatial optical modulating element 6, each of the images is shifted in proportion to the pitch of the element holograms and multiple reproduction is made.

This position of virtual image L is determined by setting the distance a3 between the spatial optical modulating element 6 and the lens array 7 and the distance L3 between the front focus of the reducing optical system and the lens array 7; i.e., by setting the length L3 of the partitions at the rear side of the lens array 7. At this time, a3 and L3 are set so that the distance between the holograms 11' and the observing point 14 is equal to or shorter than the distance between the holograms 11' and the position of virtual image L. In the case where the conjugation reference light is used as the reproducing illumination light, the holograms 11' reproduce the virtual images 13 on the spatial optical modulating element 6.

One element hologram reproduces a virtual image of one image in a plurality of images displayed on the spatial optical modulating element 6. Accordingly, it can be regarded that the pixels forming the virtual image 13 is reproduced by the luminous flux from corresponding element holograms.

Also, three-dimensional image, which can be observed from the holograms 11' is formed by these luminous flux. Accordingly, the thickness of the luminous flux determines the three-dimensional resolution of the observed three-dimensional image.

When projecting a three-dimensional image as a real image on a screen or the like neglecting the observing point, to minimize the three-dimensional resolution, the virtual image 13 is placed closer to the real image of the three-dimensional image to be observed. However, when the three-dimensional image is directly observed from the observing point, in the case of such disposal that the neighboring luminous flux enters a pupil at the observing point being spatially overlapped with each other; i.e., when the distance between the holograms 11' and the observing point is longer than the distance from the holograms 11' to the virtual image 13, the resolution of the three-dimensional image to be observed is reduced.

Accordingly, it is preferred that at least the distance between the holograms 11' and the observing point is shorter than the distance from the holograms 11' to the virtual image 13. To observe the three-dimensional image with the best image quality, the virtual image 13 has to be located at the position of the observing point.

A brief description about the distance L, the magnifying power M when converting the spatial optical modulating element 6 to the virtual image 13 and the displayed image on the spatial optical modulating element 6 will be given below.

When f1 represents a focal distance of the rear-side lens 10 in the reducing optical system; f2 represents a focal distance of the front-side lens 9 in the reducing optical system; f3 represents a focal distance of the lens array 7; a3 represents a distance between the spatial optical modulating element 6 and the lens array 7; and L3 represents a distance between the front focus of the reducing optical system and the lens array 7 or a length of the partitions at the rear side of the lens array 7, the distance L and the magnifying power M are obtained from the following expressions.

$$L = (f1/f2)^2 \times \left\{ \frac{a3 \times f3}{a3 - f3} - L3 \right\}.$$ (Expression 3)

$$M = \frac{f1}{f2} \times \frac{f3}{f3 - a3}$$ (Expression 4)

Here, assuming that pixel pitch of the spatial optical modulating element 6 is P, the vertical and horizontal resolution of the virtual image on the spatial optical modulating element becomes M×P. By arranging so that M×P<pupil diameter (approximately 3 mm) is satisfied, the number of the luminous flux, which enter the pupil from one element hologram, becomes plurality. Accordingly, even when there is a defect in the pixels, it is hardly recognized, and the three-dimensional reproduced image changes smoothly according to the changes of the observing point.

There may be a case where scattered light from the surface of the spatial optical modulating element 6 appears as a noise at the back of the reproduced object. However, the reproduced image of the spatial optical modulating element 6 itself is formed at the observing point or the backside of the observing point. Accordingly, the noise is observed at least on the reproduced three-dimensional image or at the backside thereof, the quality of the reproduced image is prevented from being degraded.

Further, the two-dimensional images as the object, which are transmitted from the three-dimensional objects to the spatial optical modulating element 6, is calculated by perspective conversion when the observing point is assumed as the position of the element holograms. That is, when a three-dimensional object is represented by the world coordinate system (xw, yw, zw), and assuming that the position of the element holograms is on the world coordinate system (x, y, 0), in the coordinate (xh, yh) on the spatial optical modulating element 6, the position of the three-dimensional objects is converted as shown by the following expressions.

$$xh = M \times (xw-x)/zw$$ (Expression 5)

$$yh = M \times (yw-x)/zw$$ (Expression 6)

To describe the above more in detail, brightness information and color information of the (xw, yw, zw) are transmitted to the coordinate (xh, yh), and on the spatial optical modulating element 6, a calculated two-dimensional images are displayed. At this time, when plural pieces of information are overlapped at the identical (xh, yh) coordinate, in many cases, in order to dispose the virtual image 13 of the spatial optical modulating element 6 closer to the observer, by comparing the zw, and the information which is closer to the virtual images 13 of the spatial optical modulating element 6 is selected.

Concrete example of the used elements will be described below.

3×4=12 element holograms are exposed as a batch at every pitch of 0.66 mm, and each angle of vision (divergent angle of reproducing light beams from the element holograms) is set to ±30°. As for the spatial optical modulating element 6, Model: LCX023AL, SONY Corporation, pixel pitch: 26 μm, number of pixels: 1024×768 is used. On this spatial optical modulating element 6, images of 256×256 are displayed on the 3×4=12 images simultaneously. As for the reduction ratio by the lenses 9 (L2) and 10 (L1), an aforcal optical system, which satisfies the requirement of 0.66/(26× 256)=0.1 is used. Furthermore, taking into consideration the reduction ratio of 0.1, the focal distance f3 of the lens array 7 is set to 50 mm so that light passing through a pixel, which is 100 pixels away from the optical axis, has the divergent angle of 3° from the lens array 7.

Next, the case where the spatial optical modulating element 6 is disposed closer to the light source than the front-side focal position of the lens array 7 will be considered.

SECOND EMBODIMENT

Figure 2:
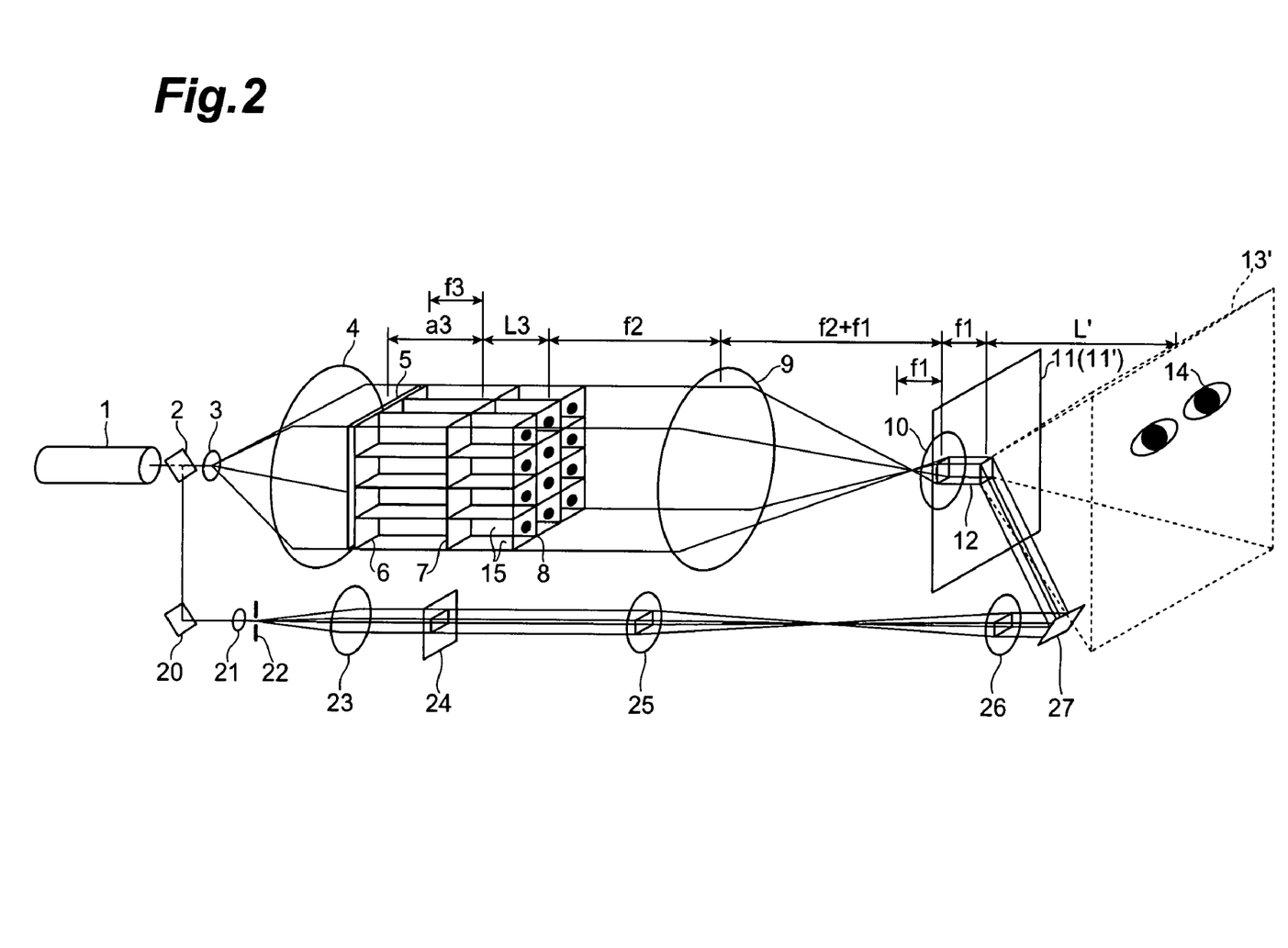
FIG. 2 is a drawing for illustrating an apparatus for producing holograms according to a second embodiment.

FIG. 2 is a drawing for illustrating an apparatus for producing holograms. In this apparatus, a plurality of images are displayed in a matrix-like configuration on a spatial optical modulating element 6; after each of the images is condensed by a lens array, which comprises a plurality of lenses corresponding to the respective images, each image is reduced and focused by a aforcal optical system; and be made to irradiate a photosensitive material 11 and recorded thereon. An image on the spatial optical modulating element 6 is formed as a real image, the observing point is located at the position of the real image, or within a range from the position of the real image to the photosensitive material.

This apparatus is the same as that in accordance with the first embodiment excepting the point that the spatial optical modulating element 6 is disposed closer to the laser light source 1 than the front-side focal position of the lens array 7. In this embodiment also, in the same steps as the above embodiment, the holograms 11' are formed of the photosensitive material 11.

In the case of a3>f3, which will be described in this embodiment, when generating the holograms 11', a light image, which is emitted from the spatial optical modulating element 6 goes through the lens array 7 and the reducing optical system 9 and 10; and thereby the image is supposed to be formed at the position (this position is referred as position of real image, and is indicated by distance L' from holograms 11' (photosensitive material 11)), where is away from the lens 10 farther than the rear-side focus of the lens 10. That is, the object light output from the lens 10 is an image from the spatial optical modulating element (referred to as real image) 13', which is supposed to be formed at the position of real image L'.

Same as the above first embodiment, using a conjugation reference light, which enters in the direction opposite to that of the reference light, as a reproducing light of the holograms 11', when conjugation light reproduction is carried out, the reproducing light, which illuminates the holograms 11', has a component of 0-th diffraction light, which transmits through the holograms 11' as it is in the proceeding direction of the light, and a component of primary diffraction light, which is reflected so as to have the same wave front as that of the object light.

When generating the holograms 11', since the real image 13', which is assumed to be formed (condensed) at the position of real image L', is recorded on each of the element holograms, by radiating with the reproducing light, the real image of the image from the spatial optical modulating element corresponding to each of the element holograms at the above position of real image L'. Further, since a plurality of images are displayed on the spatial optical modulating element 6, each of the images are shifted by a distance equivalent to the pitch of the element holograms and multiple reproduction is made.

This position of real image L' is determined by setting the distance a3 between the spatial optical modulating element 6 and the lens array 7 and the distance L3 between the front focus of the reducing optical system and the lens array 7; i.e., by setting the length L3 of the partitions at the rear side of the lens array 7. At this time, a3 and L3 are set so that the distance between the holograms 11' and the observing point 14 is equal to or shorter than the distance between the holograms 11' and the position of virtual image L. In the case where the conjugation reference light is used as the reproducing illumination light, the holograms 11' reproduce the real image 13' on the spatial optical modulating element 6.

One element hologram reproduces a real image of one image in a plurality of images displayed on the spatial optical modulating element 6. Accordingly, it can be regarded that the pixels forming the real image 13 is reproduced by the luminous flux from corresponding element holograms. Also, three-dimensional image, which can be observed from the holograms 11' is formed by these luminous fluxes. Accordingly, the thickness of the luminous flux determines the three-dimensional resolution of the observed three-dimensional image.

When projecting a three-dimensional image as a real image on a screen or the like neglecting the observing point, to minimize the three-dimensional resolution, the virtual image 13' is placed closer to the real image of the three-dimensional image to be observed. However, when the three-dimensional image is directly observed from the observing point, in the case of such disposal that the neighboring luminous fluxes enter a pupil at the observing point being spatially overlapped with each other; i.e., when the distance between the holograms 11' and the observing point is longer than the distance from the holograms 11' to the virtual image 13, the resolution of the three-dimensional image to be observed is reduced. Accordingly, it is preferred that at least the distance between the holograms 11' and the observing point is shorter than the distance from the holograms 11' to the real image 13'. To observe the three-dimensional image with the best image quality, the real image 13' has to be located at the position of the observing point.

The distance L', the magnification and the perspective conversion and the like are obtained by replacing L with L' in the above expressions (3)–(6).

As another embodiment, an apparatus for producing holograms, in which the above spatial optical modulating element 6 is eliminated, and another image of the spatial optical modulating element is projected to the above diffusing plate 5, is the same in the aspect of the effectiveness. That is, it may be arranged so that the above image from the spatial optical modulating element is projected onto the diffusion screen, and the diffusion screen is disposed at the same position as the spatial optical modulating element 6 described in the above first or second embodiment.

Next, another embodiment, in which the spatial optical modulating element is illuminated by a diffusion surface light source to make the optical distribution of the element holograms be uniform and to increase the changeability of the size; the image on the spatial optical modulating element is formed as a virtual image; and the observing point is located at the position of the virtual image or within a range from the position of virtual image to the photosensitive material, will be described.

THIRD EMBODIMENT

Figure 3:
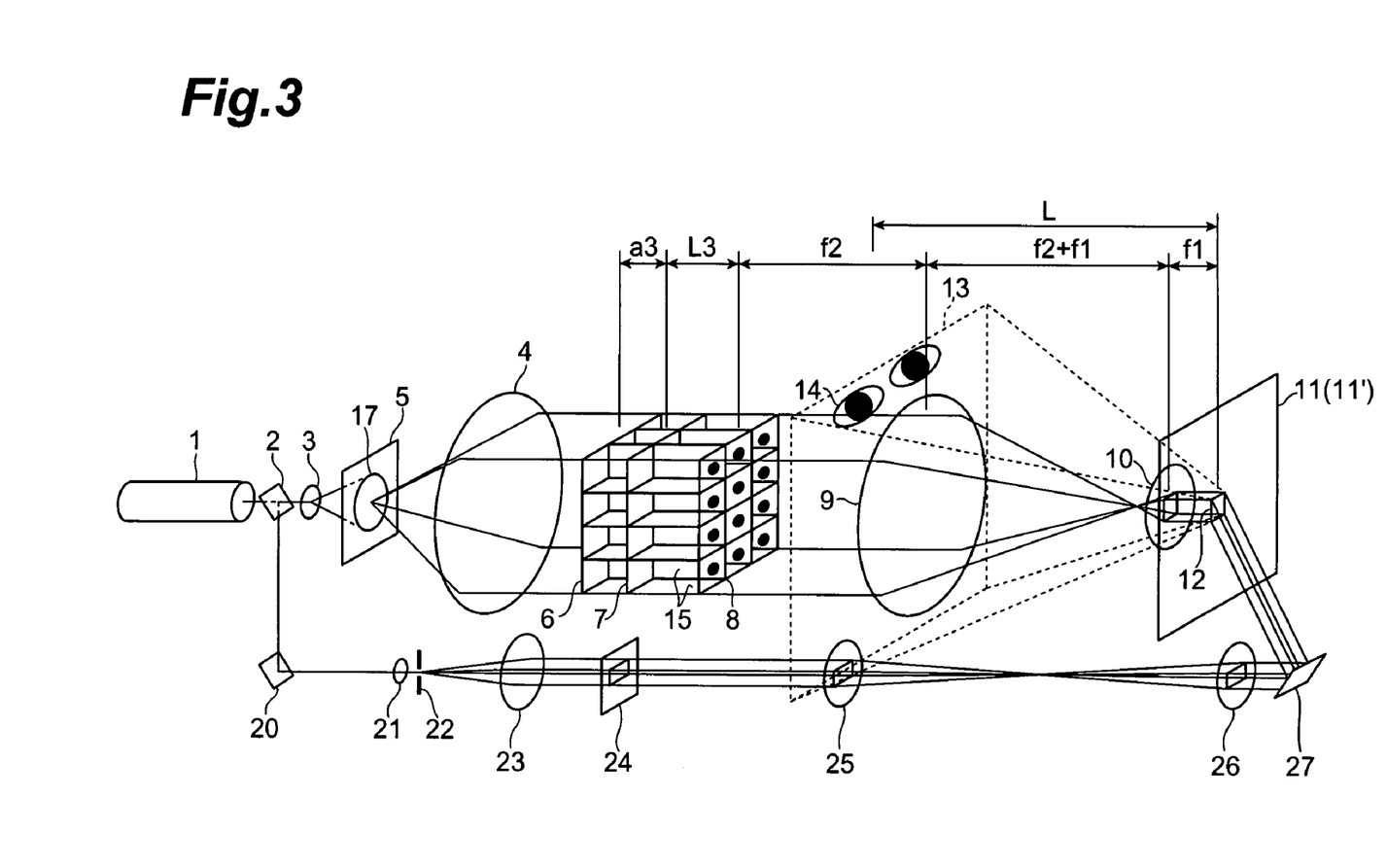
FIG. 3 is a drawing for illustrating an apparatus for producing holograms according to a third embodiment.

FIG. 3 is a drawing for illustrating an apparatus for producing holograms, which is equipped with an optical system that illuminates spatial optical modulating element 5 with a diffusion surface light source. Different points between the third embodiment and the first embodiment are as described below. That is, the diffusing plate 5 is eliminated; the beam from laser light source 1 is expanded by the lens 3 and is made to irradiate the diffusing plate 5, thereby a diffusion surface light source 17 is activated as a new light source; and by the lens 4 and the lens array 7, which are tandem-disposed, the diffusion surface light source 17 are multi-focused on the front-side focal plane 8 of the lens 9. The optical disposition other than the above is the same as that of the first embodiment.

First, the optical system that focuses the diffusion surface light source with an aforcal optical system, which is equivalent to a particular case of a tandem lens optical system, will be described.

The diffusion surface light source 17 is disposed at the front-side focal plane of the lens 4, and the rear-side focal plane of the lens 4 coincides with the front-side focal plane of the lens array 7. In this case, the diffusion surface light source 17 is focused on the front-side focal plane 8 of the lens 9. When the focal distance of the lens 4 is represented with f4, the focal distance of the lens array 7 is represented with f3, and the light source imaging magnification is represented with Ms, the size of the images are resulted in a size which is multiplied by Ms obtained by the following expression.

$$Ms = f3/f4 \quad \text{(Expression 7)}$$

Accordingly, the size of the light condensing distribution of the respective images at the front-side focal plane 8 of the lens 9 can be changed using the (expression 7). Here, no gap is generated among the element holograms 11 by producing the size of the light condensing distribution of the above images at least to a size larger than the size of one image in the plurality of images, which are displayed on the spatial optical modulating element 6. This can be arranged by changing the size of the diffusion surface light source 17, or by increasing the focal distance of the lens 4.

Next, in the case of common tandem lens system, when f indicates a composite focal distance; the distance between two lenses is represented with d; and the distance from the second lens to the rear-side focus of the composite lens is represented with S2, the following relationships are established.

$$f = f1 \times f2/(f1+f2-d) \quad \text{(Expression 8)}$$

$$d = f2 \times (f1-d)/(f1+f2-d) \quad \text{(Expression 9)}$$

The image formation position of the diffusion surface light source and the imaging magnification thereof are obtained from these expressions. Here, since the luminous flux be made to irradiate the spatial optical modulating element 6 are diffusion lights, spot patterns called as speckles are formed on the surface of the spatial optical modulating element 6 being overlapped with each other. When the average diameter of the speckles is larger than the modulating (pixel) distance P of the spatial optical modulating element 6, the spot patterns are also formed being overlapped with each other on the virtual image 13 of the spatial optical modulating element 6, which is reproduced from the element holograms. When the size is larger than the pupil diameter, there may be a case where the element holograms are hardly seen from the observing point 14. Accordingly, it is necessary to reduce the diameter of the speckles on the spatial optical modulating element 6 as small as possible.

Figure 4:
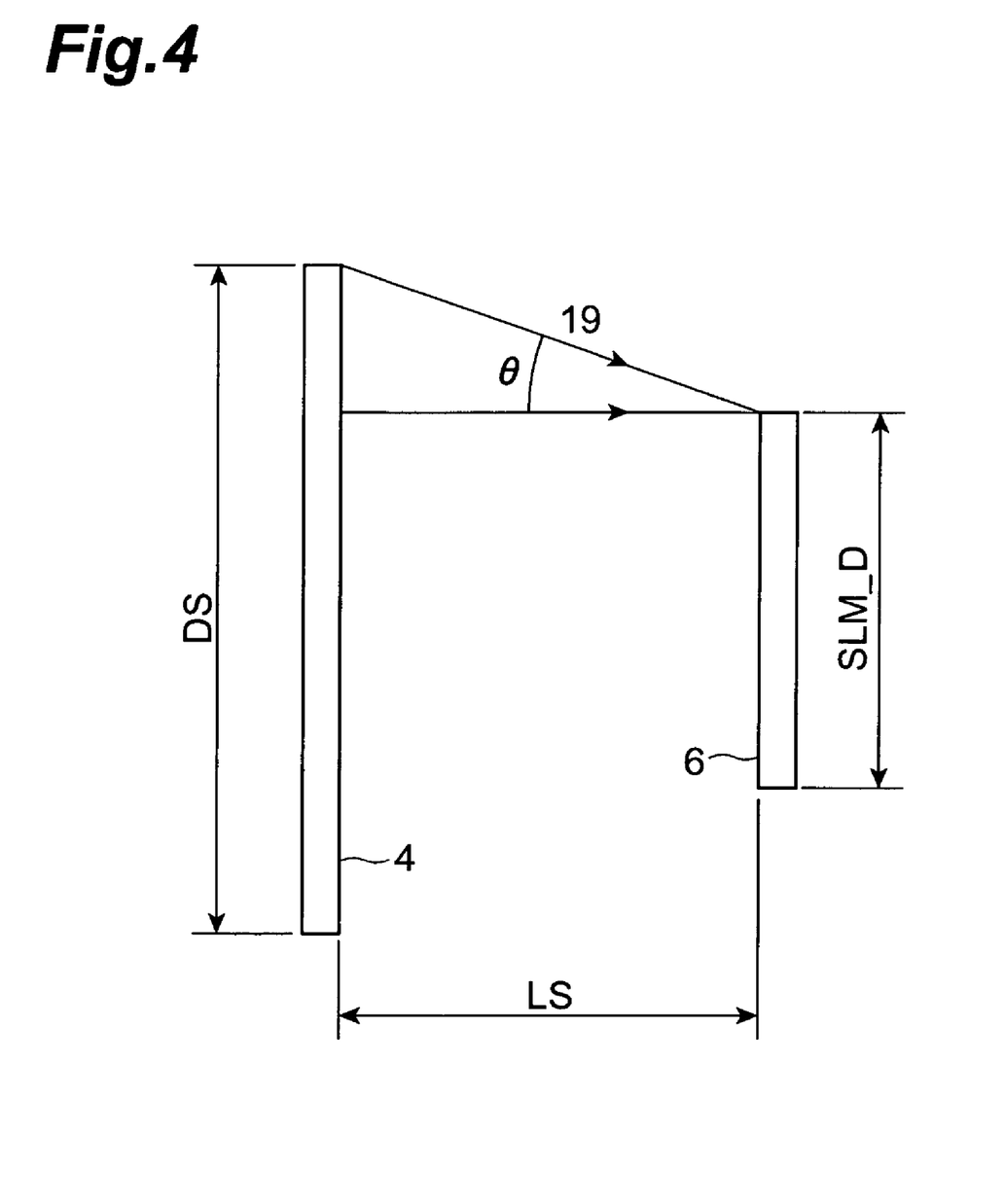
FIG. 4 is a drawing for showing the relationship between a spatial optical modulating element 6 and a lens 4.

As shown in FIG. 4, assuming that a plane 19, which connects the edge point of the spatial optical modulating element 6 of length SLM_D to the effective aperture DS of the lens 4, is a second diffusion surface light source, and the distance between the lens 4 and the spatial optical modulating element 6 is represented with LS, the average diameter δ of the speckles is obtained from the following expression.

$$\delta = 1.2 \times \lambda \times LS/(DS-SLM\_D) < P \quad \text{(Expression 10)}$$

Now, an example of values is given. In the case of LS=10 cm and λ=0.6 μm with respect to P>δ=26 μm, it is resulted in DS>29.4 mm. When the speckle average diameter δ is set so as to be smaller by one digit, it is resulted in as DS>54.3 mm with respect to δ=2.6 μm.

Or, based on the concept of interference, when considering the interference between 2 luminous fluxes, which have distance between the modulating elements (pixel pitch) P of the spatial optical modulating element 6, the incident angle θ onto the spatial optical modulating element 6; i.e., the divergent angle (half angle value) of the incident light, which is viewed from one pixel next thereto, is approximated by the following expression.

$$\theta = \sin^{-1}(\lambda/P) \quad \text{(Expression 11)}$$

Giving one example of these values, when P=26 μm and λ=0.6 μm, it is resulted in θ=1.32°. Tan θ is obtained by the following expression.

$$\tan \theta = ((DS-SLM\_D)/2)/LS \quad \text{(Expression 12)}$$

DS, which satisfies these 2 expressions (expression 11 and expression 12) is DS=31.1 mm; it is smaller than the value which satisfies δ. Accordingly, it is necessary to prepare the second diffusion surface light source 19 which has at least an angle θ in (expression 11), or preferably, larger than that. To achieve this, the aperture diameter of the lens 4 has to be greater than DS; and further the diffusion light has to enter in this diameter.

In order to achieve this, referring to FIG. 3, the laser light is expanded by the lens 3 to control the divergent angle thereof. To be more precise, it is arranged so that the focal distance of the lens 3 to be short enough to generate the second diffusion surface light source having DS or more.

A hologram was made under the following conditions. That is, the diameter of the diffusion surface light source 17 is 1.5 cm, F-value of the lens 4 is F1.2, focal distance f is 50 mm, effective aperture is 35.7 mm, the distance between the lens 4 and the spatial optical modulating element 6 is 6 mm, and the speckle average diameter δ is 0.5 μm. When the observing point was located at the reproduced images on the spatial optical modulating element 6 from the element holograms and the element holograms are observed. There were no such cases that the element holograms were hardly observed.

That is, in this embodiment, assuming that λ is the wavelength of the diffusion light, which is generated from the diffusion surface light source and P is the distance between the modulating elements of the spatial optical modulating element; the relationship between the diameter DS of the convex lens 4, which is close to the diffusion surface light source 17 in the tandem lens system, and the distance LS between the convex lens 4 and the spatial optical modulating element 6 is placed at an arbitrary position in the spatial optical modulating element 6; and it is arranged so that diameter DS of the convex lens and the distance LS between the convex lens DS and the spatial optical modulating element 6 is arranged so that at least the angle of θ in the expression 11 is maintained. In this case, the distance of the interference fringes by the diffusion surface light source 17, which are generated on the spatial optical modulating element 6, becomes substantially smaller than the gap between the modulating elements of the spatial optical modulating element 6. Accordingly, the following effect is generated. That is, such probability that pixels of the images, which are displayed on the spatial optical modulating element 6, are not illuminated with light resulting in defective images is reduced.

The area of the diffusion surface light source 17 is an area which is covered only by the diffusion light made incident all over the diameter of the convex lens 4. The distance of the interference fringes due to the diffusion surface light source, which are generated on the spatial optical modulating element 6 becomes substantially smaller than the gap between the modulating elements of the spatial optical modulating element 6.

Since being formed at the observing point or at the backside of the observing point, the reproduced image of the spatial optical modulating element 6 itself is observed at least on the reproduced three-dimensional image or the backside thereof. Accordingly, the quality of the reproduced image thereof is not degraded.

Next, another embodiment, in which spatial optical modulating element is illuminated by a diffusion surface light source to make the optical distribution of the element holograms be uniform and increase the changeability of the size; and the images on the spatial optical modulating element are formed as real images; and the observing point is located at the position of real images or within a range from the position of real images to the photosensitive material, will be described.

FOURTH EMBODIMENT

Figure 5:
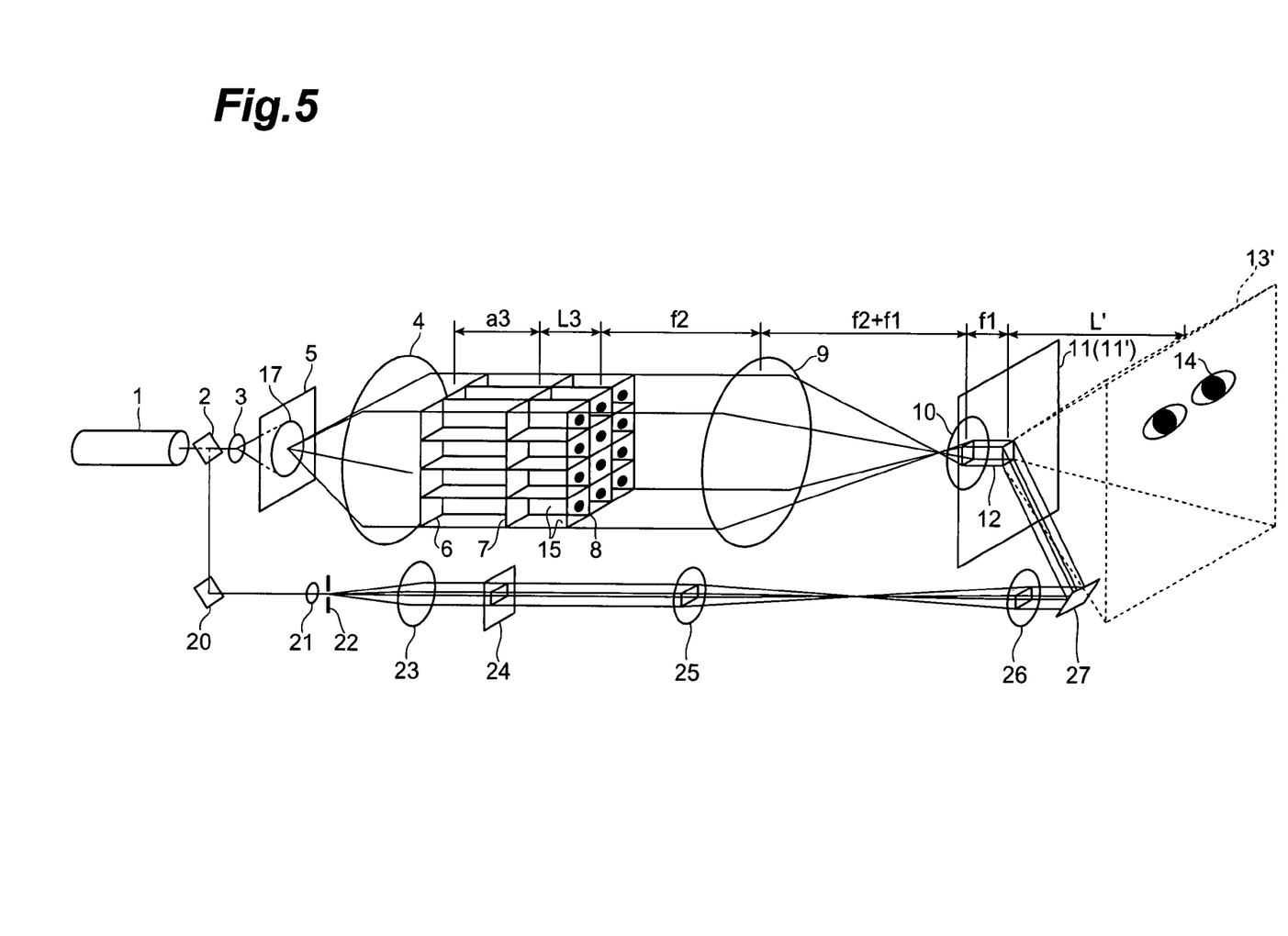
FIG. 5 is a drawing for illustrating an apparatus for producing holograms according to a fourth embodiment.

FIG. 5 is a drawing for illustrating an apparatus for producing holograms, which is equipped with an optical system that illuminates spatial optical modulating element with a diffusion surface light source. Different points between the fourth embodiment and the second embodiment are as described below. That is, the diffusing plate 5 is eliminated; the beam from laser light source 1 is expanded by the lens 3 and is made to irradiate the diffusing plate 5, thereby a diffusion surface light source 17 is activated as a new light source; and by the lens 4 and the lens array 7, which are tandem-disposed, the diffusion surface light source 17 are focused on the front-side focal plane 8 of the lens 9.

The optical disposition other than the above is the same as that of the second embodiment. In the afocal lens system, the distance L', the magnifying power M and the position of the three-dimensional objects are the same as the (expression 3) through (expression 6); and the light source imaging magnification is the same as the (expression 7). Also, in the common tandem lens system, in the same manner as the second embodiment, the image formation position of the diffusion surface light source and the magnification thereof are obtained from the expression 8 and the expression 9. Further, the laser light is expanded by the lens 3 to control the divergent angle thereof.

As described above, according to the method for producing holograms of the first through fourth embodiments, in the method for producing holograms wherein a plurality of images displayed on a spatial optical modulating element 6 or diffusion screen (not shown) are used as object light, through a lens array 7 composed of a plurality of lenses disposed corresponding to the respective images, which are included in the object light and a reducing optical system 9 for reducing the object light emitted from the lens array 7, the object light is made to irradiate the recording surface 11 along with a reference light; thereby interference light between the object light and the reference light is record on the recording surface 11, partitions 15 for separating the respective images are provided at least between the spatial optical modulating element 6 and the lens array 7. On the recording surface 11, the interference light between the object light and the reference light is recorded simultaneously.

Also, the distance between a display surface of the plurality of images and the lens array composed of a plurality of lenses and the distance between the lens array and the reducing optical system are arranged so that the position of real image or virtual image formed by the lens array and the reducing optical system on the display surface of the plurality of images coincides with the observing position of the holograms, or is away from the holograms.

According to the method for producing holograms of the present invention, to prevent the condensed light images of the lens array from overlapping with each other, the partitions 15 are provided between the spatial light element and the lens array. Thereby, the light for recording element holograms in the neighboring region where particular element holograms are recorded is prevented from being mixed with the light. Accordingly, element holograms can be recorded in order without gaps.

Owing to this, it is possible to prevent the thickness of the luminous flux, which reproduces the pixels of the spatial optical modulating element from the element holograms, from becoming undesirably thick. Accordingly, the spatial resolution of the observed reproduced three-dimensional images can be improved.

According to the method for producing holograms of the first to fourth embodiments, the diffusion light source is provided at the front side of the spatial optical modulating element 6. Since diffusion light is made to irradiate the spatial optical modulating element 6, the illuminance on the spatial optical modulating element 6 is made to be uniform. Also, owing to the diffusion light, the size of the respective condensed light images of the lens array 7 becomes larger than the size of each plural images displayed on the spatial optical modulating element 6.

The diffusion light source is composed of the laser light source 1 and the diffusing plate 6 disposed between the laser light source 1 and the spatial optical modulating element 6. The emitted light from the diffusing plate 5 may be directly made incident into the spatial optical modulating element 6. In this case, such effect that an extremely simple and inexpensive diffusion light generating means can be obtained. Further, the diffusion light source is, as demonstrated in third and fourth embodiments, equipped with the magnifying lens 3 that expands the beam diameter of the laser light, which is emitted from the laser light source 1, to be made to irradiate the diffusing plate 5 and the collimating lens 4 that changes the diffusion light, which is emitted from the diffusing plate 5, into a parallel light to be made to irradiate the spatial optical modulating element 6.

In this case, different from the afocal lens, in which at the rear-side focal plane of a first convex lens, the spatial optical modulating element and the front-side focal plane of a second convex lens are disposed, a freedom is obtained in the disposition of the spatial optical modulating element 6 and the two convex lenses 3 and 4. Accordingly, a freedom with respect to the image formation position and the imaging magnification of the diffusion surface light source 17 is also obtained.

The reproducing distance L to the real image 13 of the spatial optical modulating element, which is reproduced by holograms 11', is obtained by setting a3 and L3 so that the relationship in the expression (13) is satisfied; wherein, the observing distance from the hologram 11' to the observing position 14 is represented with Le; the distance between the spatial optical modulating element 6 and the lens array 7 is represented with a3; the distance between the front focus of the reducing optical system and lens array 7, i.e., the length of the partitions at the rear side of the lens array 7 is represented with L3; the focal distance of rear-side lens 10 in the reducing optical system is represented with f1; the focal distance of the front-side lens 9 of the reducing optical system is represented with f2; and the focal distance of the lens array 7 is represented with f3.

$$Le <= L = (f1/f2)^2 \times \left\{ \frac{a3 \times f3}{a3 - f3} - L3 \right\}$$ (Expression 13)

By setting the reproducing distance L, the size of the image of the spatial optical modulating element and the size of the pixels to be reproduced are also determined; and further, the thickness of the luminous flux, which connects the element holograms and the pixels, is determined. Accordingly, the following effect is obtained; i.e., the spatial resolution of the reproduced three-dimensional images can be determined. When the above inequality sign is satisfied, it is possible to avoid such disposition that the neighboring luminous flux enters the pupils at the observing point being spatially overlapped with each other, which occurs when the distance between the holograms 11' and the observing point is longer than the distance from the holograms 11' to the virtual image 13. Accordingly, the following effect is obtained; i.e., the quality of the observed three-dimensional images is improved. And when the equal sign is satisfied, the following effect is obtained; i.e., the three-dimensional images can be observed with the best image quality.

Even when noises are included in the reproduced images of the spatial optical modulating element 6 itself, or noises are included in the reproduced images of the projected images of the spatial optical modulating element 6, since the noises themselves are formed at the observing point or in the backside of the observing point, the noises are observed at least on the reproduced three-dimensional images. Accordingly, such situation that the quality of the reproduced images is degraded is prevented.

According to the method for producing holograms of the present invention, the element holograms can be recorded with an appropriate size in order with no gaps. Owing to this, it is possible to prevent the thickness of the luminous flux, which reproduces the pixels of the spatial optical modulating element from the element holograms, from becoming undesirably thick. Also, by arranging the distance between the lens array and the spatial optical modulating element, and the distance between the lens array and the reducing optical system, it is possible to arrange the thickness of the luminous flux, which reproduces the pixels of the spatial optical modulating element from the element holograms. Accordingly, the following effect is obtained; i.e., the spatial resolution of the observed reproduced three-dimensional images is improved.

Further, with respect to the position of the reproduced spatial optical modulating element, it is possible to arrange so that the neighboring luminous flux enters the pupils at the observing point but does not spatially overlapped with each other. That is, it is possible to arrange so that the distance between the holograms and the observing point is equal to or shorter than the distance from the holograms to the reproduced images of the spatial optical modulating element. Accordingly, the following effect is obtained; i.e., the quality of the observed reproduced three-dimensional images is improved. Simultaneously, unexpected scattered light, which is generated from the surface of the spatial optical modulating element, is focused at the observing point or in the backside of the observing point, and is observed at least on the reproduced three-dimensional images or in the backside thereof. Accordingly, the following effect is also obtained; i.e., the quality of the reproduced images can be prevented from degraded.

INDUSTRIAL APPLICABILITY

The present invention can be used in a method for producing holograms.

The invention claimed is:

1. A method for producing holograms wherein a plurality of images displayed on a spatial optical modulating element or diffusion screen are used as object light, through a lens array composed of a plurality of lenses disposed corresponding to the respective images included in the object light and a reducing optical system for reducing the object light emitted from said lens array, said object light is made to irradiate the recording surface along with a reference light; thereby interference light between said object light and said reference light is recorded on the recording surface, characterized in that partitions for separating said respective images are provided at least between said spatial optical modulating element and said lens array.

2. The method for producing holograms according to claim 1, wherein a diffusion light source is provided in front of said spatial optical modulating element.

3. The method for producing holograms according to claim 1, wherein said diffusion light source is provided with a laser light source and a diffusing plate disposed between the laser light source and said spatial optical modulating element.

4. The method for producing holograms according to claim 3, wherein said diffusion light source is provided with a magnifying lens that expands the beam diameter of a laser light emitted from said laser light source to be made to irradiate said diffusing plate and a collimating lens that changes the diffusion light emitted from said diffusing plate to a parallel light to be made to irradiate said spatial optical modulating element.

5. The method for producing holograms according to claim 4, wherein when the wavelength of the luminous flux emitted from said diffusing plate is represented with λ; the diameter of said collimating lens is represented with DS; the distance between said collimating lens and said spatial optical modulating element is represented with LS; the angle formed by the optical axis of said collimating lens and a line connecting an edge portion in the diameter direction of the collimating lens and an edge portion of said spatial optical modulating element is represented with θ; and the pitch between the pixels displayed on said spatial optical modulating element is represented with P, DS and LS are arranged so that θ is resulted in $\sin^{-1}(\lambda/P)$ or more.

6. The method for producing holograms according to claim 1, wherein the distance between a display surface of said plurality of images and the lens array composed of a plurality of lenses and the distance between said lens array and said reducing optical system are arranged so that the position of real image or virtual image formed by said lens array and said reducing optical system on said display surface coincides with the observing position of said holograms, or is away from said holograms.

* * * * *